United States Patent
Reed et al.

(10) Patent No.: US 10,684,916 B2
(45) Date of Patent: Jun. 16, 2020

(54) DATA SET ALLOCATION TECHNIQUE TO PRESERVE DELETED DATA SETS

(71) Applicant: International Business Machines Corporation, Armonk, NY (US)

(72) Inventors: David C. Reed, Tucson, AZ (US); Kenneth J. Owin, Tucson, AZ (US); Esteban Rios, Tucson, AZ (US); Harold S. Huber, Scottsdale, AZ (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 16/114,140

(22) Filed: Aug. 27, 2018

(65) Prior Publication Data

US 2020/0065192 A1 Feb. 27, 2020

(51) Int. Cl.
*G06F 11/00* (2006.01)
*G06F 11/14* (2006.01)
*G06F 3/06* (2006.01)

(52) U.S. Cl.
CPC ........ *G06F 11/1435* (2013.01); *G06F 3/0604* (2013.01); *G06F 3/067* (2013.01); *G06F 3/0631* (2013.01); *G06F 3/0652* (2013.01); *G06F 11/1451* (2013.01); *G06F 11/1469* (2013.01)

(58) Field of Classification Search
CPC ............. G06F 11/1084; G06F 11/1088; G06F 11/1092; G06F 11/2053; G06F 11/2056; G06F 11/2058
USPC .................................. 714/6.22, 6.2
See application file for complete search history.

(56) References Cited

U.S. PATENT DOCUMENTS

| | | | | |
|---|---|---|---|---|
| 8,918,661 | B2 * | 12/2014 | Shigemura | G06F 1/3221 713/320 |
| 9,032,772 | B2 * | 5/2015 | Dykstra | B21D 37/16 72/342.7 |
| 9,367,397 | B1 | 6/2016 | Xie et al. | |
| 2008/0301256 | A1 * | 12/2008 | McWilliams | G06F 12/0802 709/214 |

(Continued)

FOREIGN PATENT DOCUMENTS

IN 201641024236 A 1/2018

OTHER PUBLICATIONS

IP.com, "Improving undelete probability by changing the existing resource allocation scheme," IBM, IP.com No. IPCOM000028659D, May 26, 2004.

(Continued)

*Primary Examiner* — Sarai E Butler
(74) *Attorney, Agent, or Firm* — Nelson and Nelson; Daniel P. Nelson; Alexis V. Nelson (57) ABSTRACT

A method for allocating storage space in a volume to a new data set is disclosed. In one embodiment, such a method includes maintaining, for a volume, a record of available storage elements. The method further receives an allocation request to allocate available storage elements in the volume to accommodate a new data set. The method allocates available storage elements in the volume to the new data set to fulfill the allocation request. In doing so, the method favors storage elements that have been available for a longer amount of time over storage elements that have been available for a shorter amount of time. A corresponding system and computer program product are also disclosed.

12 Claims, 9 Drawing Sheets

(56) References Cited

U.S. PATENT DOCUMENTS

| | | | | |
|---|---|---|---|---|
| 2010/0023797 A1* | 1/2010 | Atluri | ................. | G06F 11/0751 |
| | | | | 714/2 |
| 2010/0306583 A1* | 12/2010 | Kim | ...................... | G11C 29/82 |
| | | | | 714/6.13 |
| 2011/0264847 A1* | 10/2011 | Hsiao | ................. | G06F 12/0246 |
| | | | | 711/103 |
| 2012/0131380 A1* | 5/2012 | Horman | .............. | G06F 11/1415 |
| | | | | 714/6.1 |
| 2012/0246397 A1* | 9/2012 | Nakai | ................. | G06F 12/0638 |
| | | | | 711/103 |
| 2013/0283095 A1* | 10/2013 | Dhuse | ................... | H04L 9/0869 |
| | | | | 714/6.22 |
| 2014/0229658 A1* | 8/2014 | Maharana | ........... | G06F 12/0246 |
| | | | | 711/103 |
| 2015/0039934 A1* | 2/2015 | Resch | ................... | G06F 3/0638 |
| | | | | 714/6.22 |
| 2018/0356989 A1* | 12/2018 | Meister | ............... | G06F 11/2064 |

OTHER PUBLICATIONS

IP.com, "A Method and System for Rebuilding a Data Set Control Block Residing in a Volume Table of Contents," IP.com No. IPCOM000240756D, Feb. 26, 2015.

IP.com, "Create a summary of all DASD extents allocated to a data set," IBM, IP.com No. IPCOM000231858D, Oct. 9, 2013.

Friske, Michael, "Taking a Look Inside the DFSMShsm Control Data Sets," Slide Presentation Presented at Share in Atlanta, 2012.

\* cited by examiner

DATA SET ALLOCATION TECHNIQUE TO PRESERVE DELETED DATA SETS

BACKGROUND

Field of the Invention

This invention relates to systems and methods for preserving and recovering data sets that have been deleted.

Background of the Invention

Data is often one of an organization's most valuable assets. Accordingly, it is paramount that an organization protect its data, particularly its business-critical data. Statistics show that a high percentage of organizations, as high as fifty percent, are unable to recover from an event of significant data loss, regardless of whether the loss is the result of a virus, data corruption, physical disaster, software or hardware failure, human error, or the like. At the very least, significant data loss can result in lost income, missed business opportunities, and/or substantial legal liability. Accordingly, it is important that an organization implement adequate policies and procedures to prevent such losses from occurring.

In modern-day enterprise storage systems, data may be deleted in various different ways. In some cases, deletions are accidental or unintentional. For example, an expiration date for one or more data sets may be incorrectly set, thereby causing the data sets to be deleted when the expiration date arrives. In other cases, a user may intentionally delete one or more data sets, only to discover later that the data sets are needed or were deleted in error.

Once data sets are deleted, the issue becomes one of recovering the data sets if they can be recovered at all. In some cases, an organization may not have kept backups of deleted data sets, thereby preventing the data sets from being restored therefrom. In other cases, backups may have been kept but a significant amount of time or effort may be required to restore the data sets from the backups.

In view of the foregoing, what are needed are systems and methods to more efficiently recover deleted data sets. Further needed systems and methods to allocate storage space in a way that increases the probability that deleted data sets may be recovered. Ideally, such systems and methods will enable recovery of data sets without requiring backups or other potentially time-consuming recovery techniques.

SUMMARY

The invention has been developed in response to the present state of the art and, in particular, in response to the problems and needs in the art that have not yet been fully solved by currently available systems and methods. Accordingly, systems and methods have been developed to more efficiently preserve and recover deleted data sets. The features and advantages of the invention will become more fully apparent from the following description and appended claims, or may be learned by practice of the invention as set forth hereinafter.

Consistent with the foregoing, a method for allocating storage space in a volume to a new data set is disclosed. In one embodiment, such a method includes maintaining, for a volume, a record of available storage elements. The method further receives an allocation request to allocate available storage elements in the volume to accommodate a new data set. The method allocates available storage elements in the volume to the new data set to fulfill the allocation request. In doing so, the method favors storage elements that have been available for a longer amount of time over storage elements that have been available for a shorter amount of time.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Figure 1:
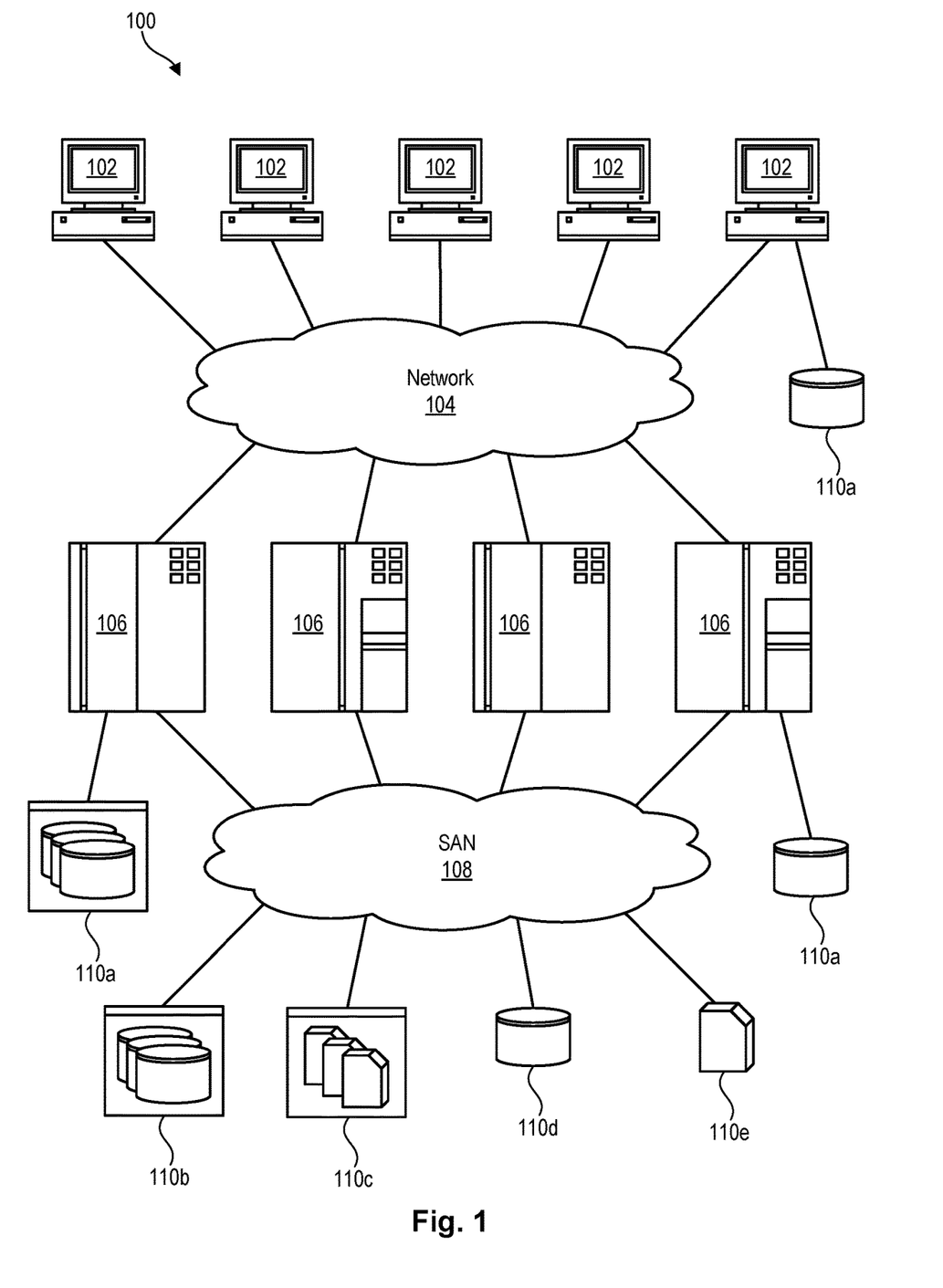
FIG. 1 is a high-level block diagram showing one example of a network environment in which systems and methods in accordance with the invention may be implemented.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of different network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 110a (e.g., arrays of hard-disk drives, solid-state drives, tape drives, etc.). These computers 102, 106 and direct-attached storage systems 110a may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110b of hard-disk drives or solid-state drives, tape libraries 110c, individual hard-disk drives 110d or solid-state drives 110d, tape drives 110e, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
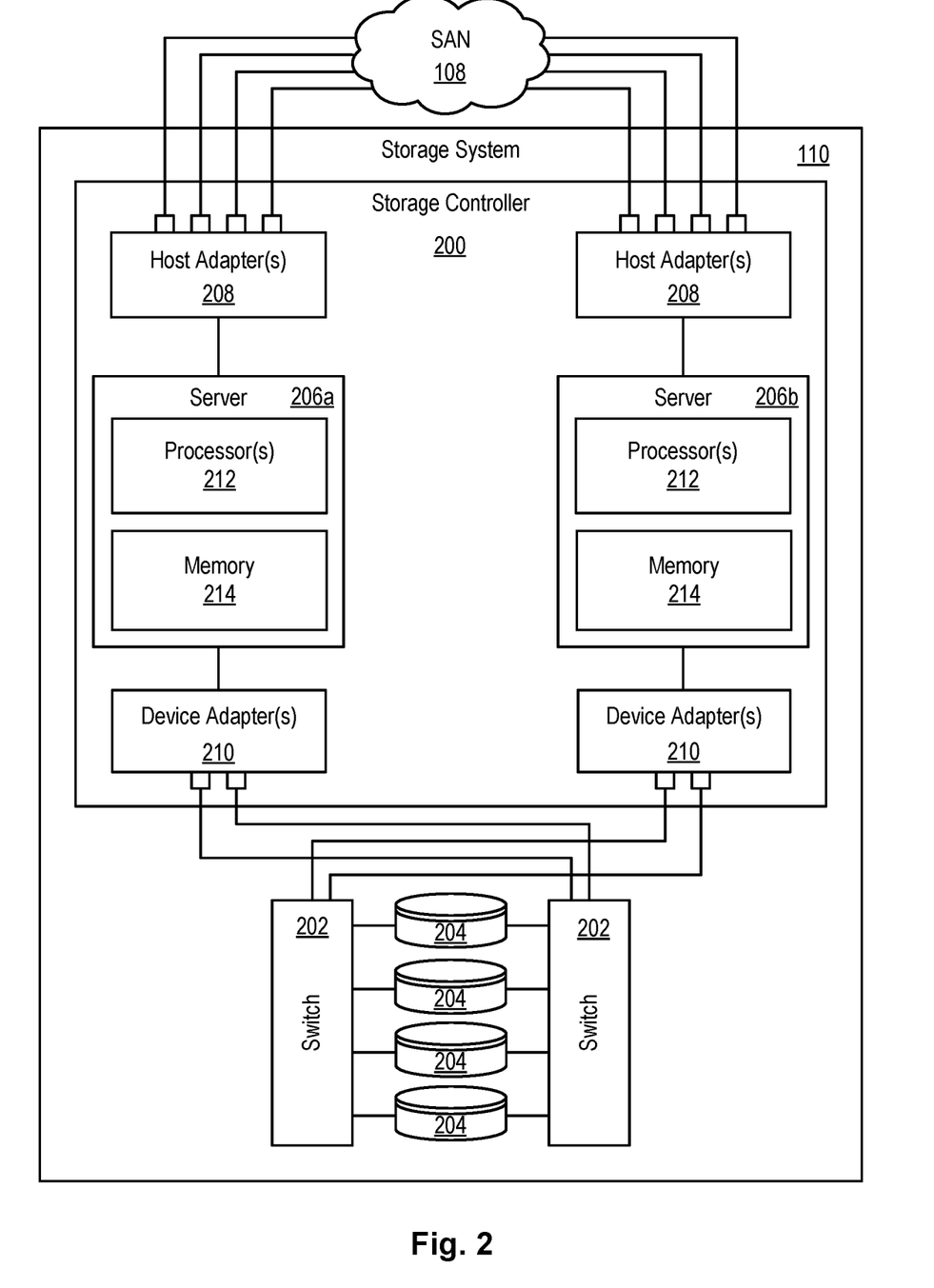
FIG. 2 is a high-level block diagram showing one example of a storage system for use in the network environment of FIG. 1.

Referring to FIG. 2, one embodiment of a storage system 110 containing an array of hard-disk drives 204 and/or solid-state drives 204 is illustrated. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented by way of example and is not intended to be limiting.

Figure 3:
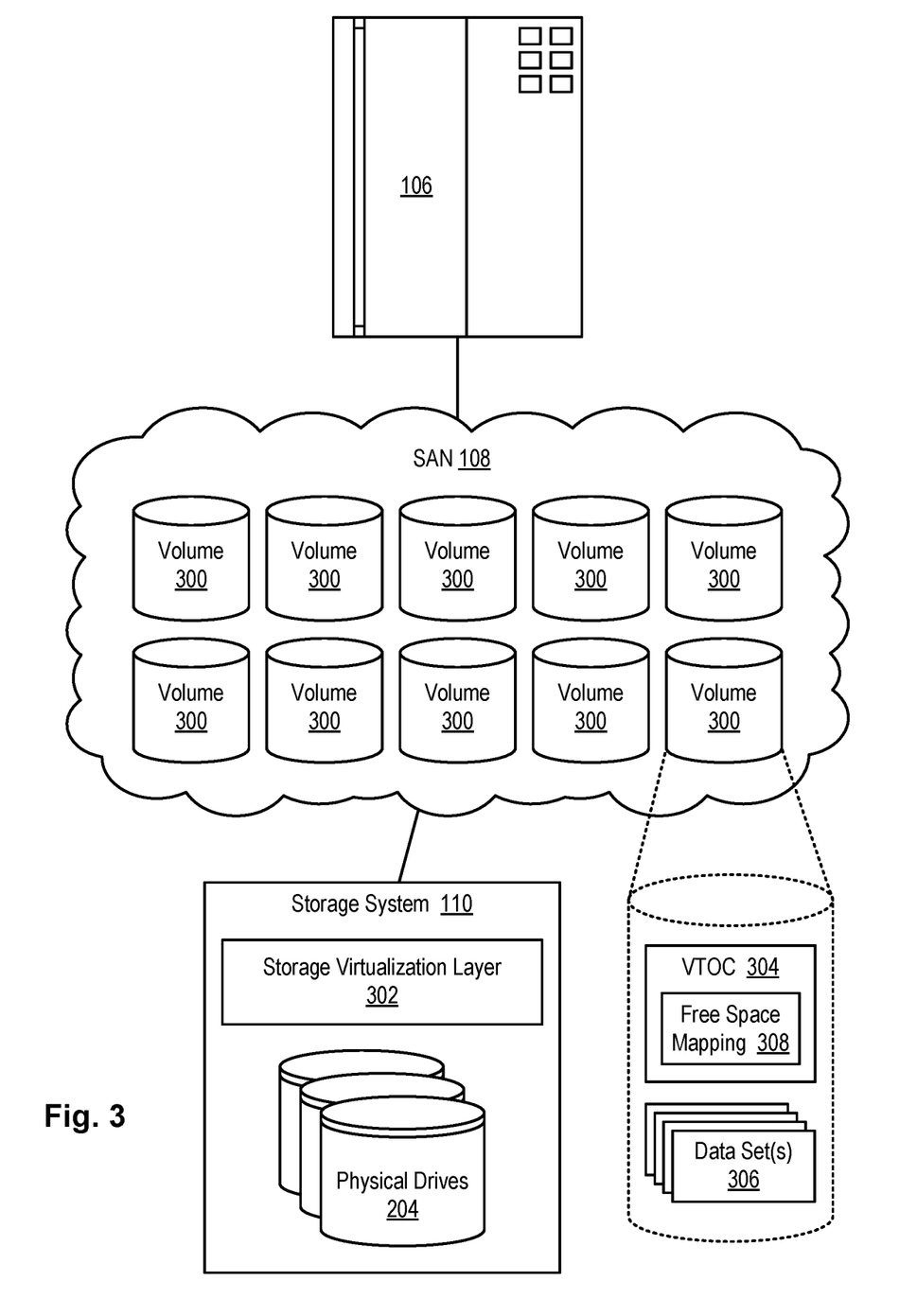
FIG. 3 is a high-level block diagram showing logical volumes that may be created within a storage system such as that illustrated in FIG. 2.

Referring to FIG. 3, in certain embodiments, a storage system 110 such as that illustrated in FIG. 2 may be configured to present or expose one or more volumes 300 to a host system 106. The volumes 300 may be logical volumes 300, meaning that the volumes 300 may appear to be physical drives 204 (e.g., hard drives, solid state drives, etc.) to a host system 106 but do not necessarily directly correlate to physical drives 204 on the storage system 110. For example, in certain embodiments, a physical drive 204 may be used by more than one logical volume 300 or a logical volume 300 may span all or part of multiple physical drives 204. A storage virtualization layer 302 within the storage system 110 may expose the logical volumes 300 and handle mapping between the logical volumes 300 and the physical drives 204.

As further shown in FIG. 3, in certain embodiments, each logical volume 300 may store a volume table of contents (VTOC) 304 and one or more data sets 306 or files 306. A VTOC 304 may contain information for locating data sets 306 on the associated logical volume 300. In certain embodiments, the VTOC 304 is located at the beginning of the logical volume 300 and may list the names of each data set 306 on the logical volume 300 as well as the data set's size, location, and permissions. The VTOC 304 may also include a free space mapping 308 that identifies storage elements (e.g., tracks, groups of tracks, etc.) within the volume 300 that are free and available to store data. The VTOC 304 is typically created at the time the logical volume 300 is initialized.

As previously mentioned, in modern-day enterprise storage systems 100 such as that illustrated in FIG. 2, data sets 306 may be deleted in various different ways and for various different reasons. These deletions may, in some cases, be accidental or unintentional. For example, an expiration date for one or more data sets 306 may be set incorrectly, thereby causing the data sets 306 to be deleted from a volume 300 when the expiration date arrives. In other cases, a user may intentionally delete one or more data sets 306 from a volume 300, only to discover later that the data sets 306 are needed or were deleted in error.

Once data sets 306 are deleted, the issue becomes one of how to recover the data sets 306, if they can be recovered at all. In some cases, an organization may not have maintained adequate backups of deleted data sets 306, thereby preventing the data sets 306 from being restored from such backups. In other cases, backups may have been kept but a significant amount of time or effort may be required to restore the data sets 306 from the backups.

In view of the foregoing, systems and methods are needed to more efficiently recover deleted data sets 306. Further needed are systems and methods to allocate storage space to new data sets 306 in a way that increases the probability that deleted data sets may be recovered. Ideally, such systems and methods will enable recovery of data sets 306 without requiring one to turn to backups or other potentially time-consuming recovery techniques.

Figure 4:
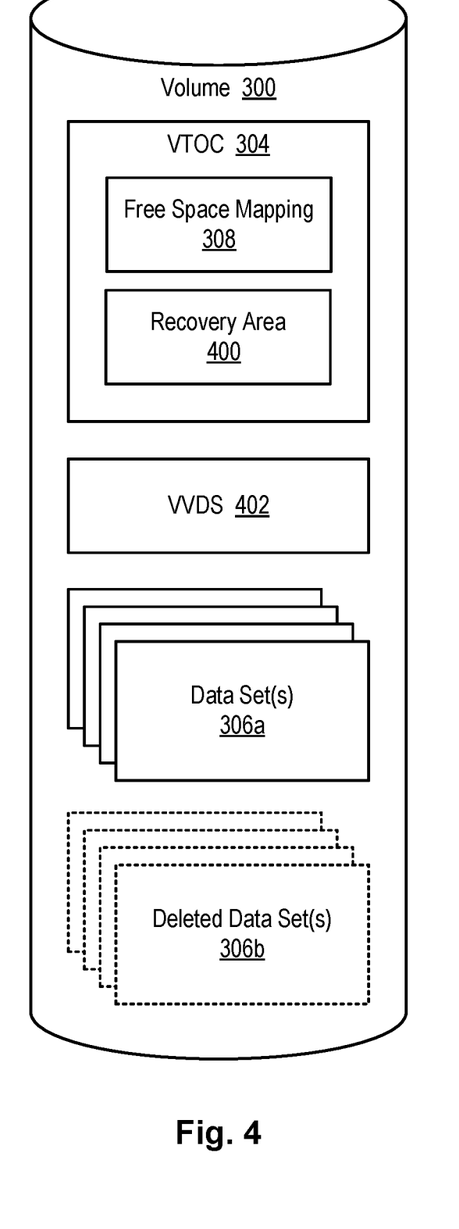
FIG. 4 is a high-level block diagram showing data sets and control information within a logical volume.

Referring to FIG. 4, in order to provide the features and benefits set forth above, in certain embodiments, a new recovery area 400 may be added to the VTOC 304 of a volume 300 to store metadata associated with deleted data sets 306b. The recovery area 400 may be provided for volumes 300 that have this feature enabled at the time of volume initialization. The metadata in the recovery area 400 may be used to recover deleted data sets 306b if and when needed. Systems and methods in accordance with the invention rely on the fact that, when a data set 306 is deleted, data associated with the deleted data set 306 still resides on the volume 300. This data will typically persist on the volume 300 until storage space occupied by the data is reallocated for another use and is all or partially overwritten.

When a data set 306 is deleted, control information (VTOC records, VVDS records, catalog information, etc.) associated with the data set 306b is typically deleted. Instead of deleting this control information, systems and methods in accordance with the invention may gather this control information and save it as metadata in the recovery area 400. This metadata may include information such as the name of the data set, storage elements (e.g., tracks, extents, etc.) the data set 306 resides on within the volume 300, as well as other volumes 300 the data set 306 resides on. This metadata may be retained in the recovery area 400 as long as data associated with the deleted data set 306 remains on the volume 300 and is not all or partly overwritten. In the event the data is all or partly overwritten, the deleted data set 306 becomes unrecoverable. In such case, the metadata associated with the deleted data set 306b may be permanently deleted from the recovery area 400.

Using metadata in the recovery area 400, systems and methods in accordance with the invention may, when an appropriate instruction is received, "undelete" (i.e., recover) a deleted data set 306. The instruction may be accompanied by information that identifies the deleted data set 306, such as data set name, volume serial number of the volume 300 that the data set 306 resides on, and the like. Using this identifying information, systems and methods in accordance with the invention may attempt to locate metadata associated with the deleted data set 306b in the recovery area 400. If no metadata is present, the deleted data set 306b is not recoverable and a message may be generated indicating that the data set 306 cannot be found or recovered.

If metadata is located in the recovery area 400, systems and methods in accordance with the invention may extract the metadata and use the metadata to rebuild control information associated with the data set 306. This may include, for example, rebuilding VTOC entries associated with the data set 306, such as by recreating format 1 and formal 3 data set control blocks (DSCBs) associated with the data set 306. This may also include passing VSAM volume data set (VVDS) information to a Catalog component to reinsert the VVDS information into a VVDS 402 associated with the volume 300. After the VVDS is rebuilt to reflect the data set 306, the Catalog component may reconstruct a basic catalog structure (BCS) so that the data set 306 is recataloged and ready for use.

Figure 5:
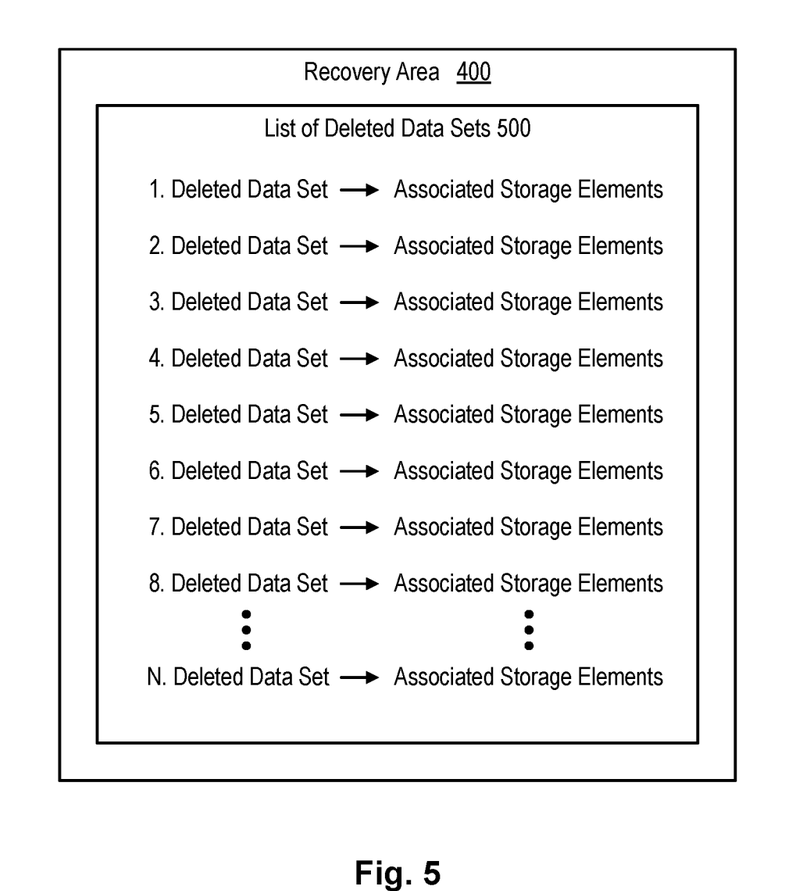
FIG. 5 is a high-level block diagram showing a list of deleted data sets maintained in a recovery area within a volume table of contents (VTOC)

Referring to FIG. 5, in certain embodiments, systems and methods in accordance with the invention may modify the handling of allocation requests to take into account deleted data sets 306b and increase the probability that deleted data sets 306b can be recovered. In conventional storage systems 110, when storage space is assigned to a new data set 306 in response to an allocation request, the storage space is allocated without preferring or prioritizing certain storage elements over others. This may cause data associated with deleted data sets 306b to be overwritten quickly and reduce the time window over which a deleted data set 306b may be restored. To address this problem, systems and methods in accordance with the invention may take into account how long storage space has been available. More specifically, storage elements that have been available the longest may be allocated first, thereby ensuring that deleted data sets 306b are recoverable for a longer period of time.

In order to modify the handling of allocation requests in the manner described above, a list 500 of deleted data sets 306b may be provided in the recovery area 400. In certain embodiments, the data sets 306 in this list 500 may be arranged in the order they were deleted. For example, deleted data set 306b whose storage space has been available the longest may be placed at the top of the list, while newly deleted data sets 306b may be added to the bottom of the list. As shown in FIG. 5, the list 500 includes an entry for each deleted data set 306b along with a set or range of storage elements (e.g., tracks, extents, etc.) that are associated with the data set 306b. When an allocation request is received, the first deleted data set 306b in the list 500 may be checked to see if its associated storage elements are sufficient to satisfy the allocation request. If not, the storage elements associated with the next deleted data set 306b in the list 500 may be included with those of the first deleted data set 306b to determine if the collective set is enough to satisfy the allocation request.

This process may be continued until enough storage elements are identified to satisfy the allocation request, while also ensuring compliance with any fragmentation restrictions associated with the new data set 306. For example, if fragmentation restrictions limit allocation of the new data set 306 to five contiguous ranges of storage elements, this may be considered when analyzing storage elements in the list 500. In some cases, it may be necessary or preferable to skip over some deleted data sets 306b and associated storage elements in the list 500 to comply with fragmentation restrictions. In general, when fulfilling allocation requests, storage elements available for a longer amount of time may be favored over storage elements available for a shorter amount of time. Once all or part of the storage elements associated with a deleted data set 306b are used to fulfill an allocation request, the deleted data set 306b may be removed from the list 500 and its metadata removed from the recovery area 400. The deleted data set 306b will no longer be recoverable.

Figure 6:
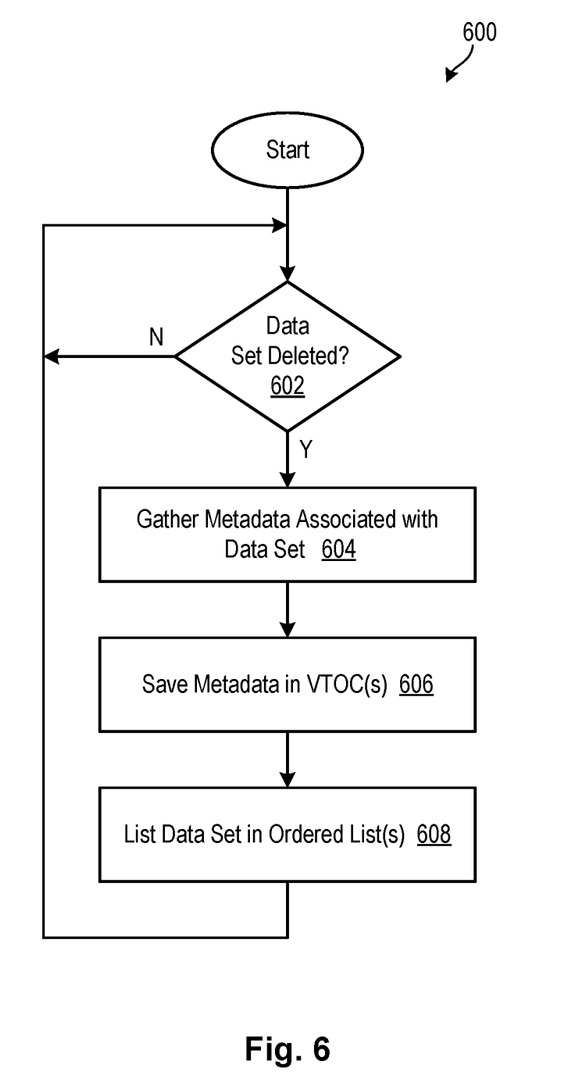
FIG. 6 is a process flow diagram showing one embodiment of a method for preserving metadata associated with a deleted data set.

Referring to FIG. 6, one embodiment of a method 600 for preserving metadata for a deleted data set 306 is illustrated. As shown, the method 600 initially determines 602 whether a data set 306 has been deleted from a volume 300. If a data set 306 has been deleted, the method 600 gathers 604 metadata associated with the deleted data set 306b and saves 606 the metadata in the recovery area 400 of the VTOC 304 of the volume 300. This may be performed in the VTOC 304 of each volume 300 from which the data set 306 was deleted. This metadata may include information needed to rebuild control information associated with the deleted data set 306b in the event the deleted data set 306b is restored at some point in the future. The method 600 also inserts 608 the deleted data set 306b into the ordered list 500 previously discussed.

Figure 7:
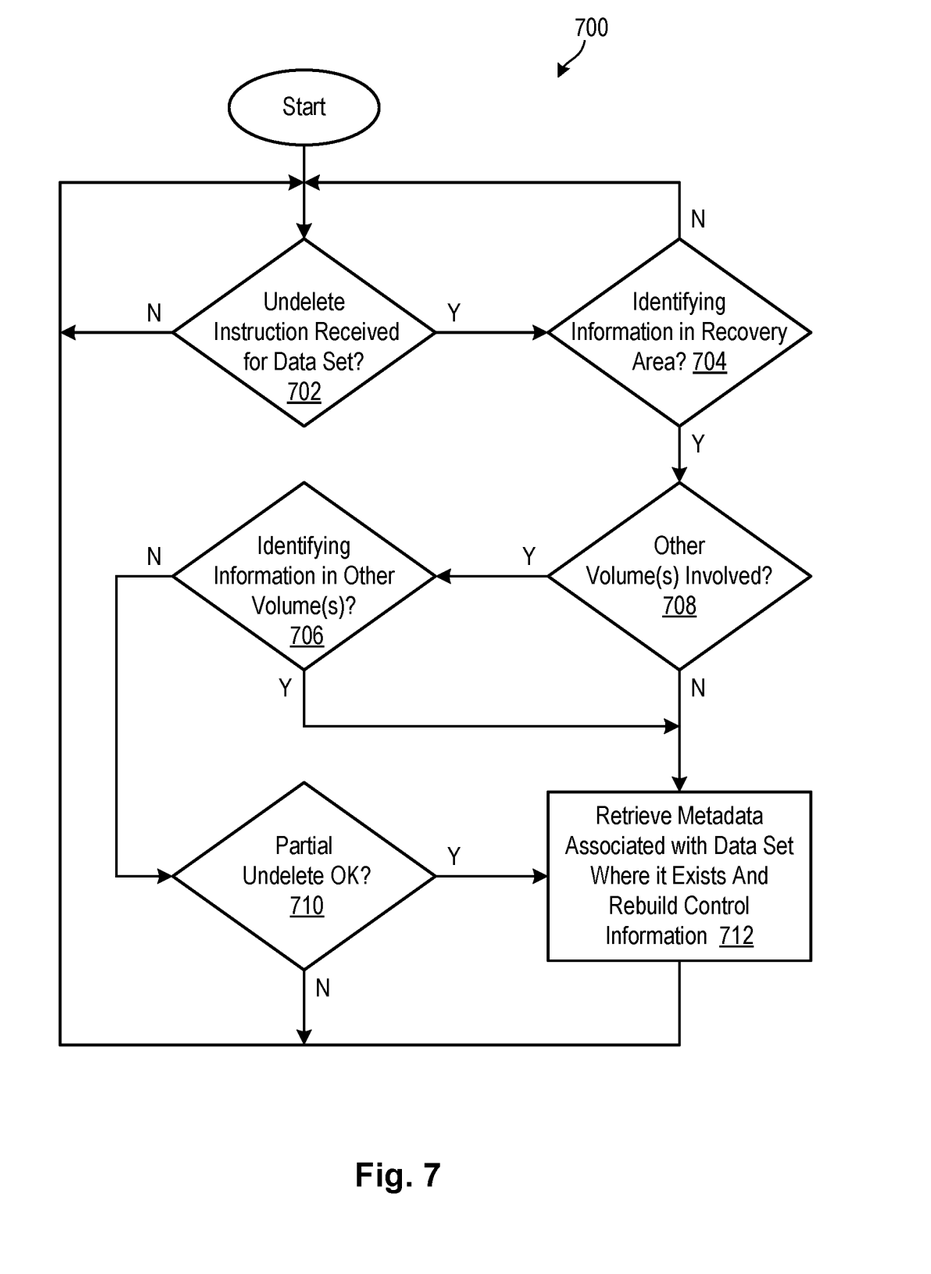
FIG. 7 is a process flow diagram showing one embodiment of a method for "undeleting" a deleted data set.

Referring to FIG. 7, one embodiment of a method 700 for "undeleting" a deleted data set 306b is illustrated. As shown, the method 700 initially determines 702 whether it has received an instruction to "undelete" a deleted data set 306b. This instruction may include information identifying the deleted data set 306b, such as a data set name and volume serial numbers for volumes 300 in which the deleted data set 306b was stored. In certain cases, a user may retrieve the data set name from System Management Facility (SMF) records if the user does not know the exact name of a data set 306 that the user wants to restore.

The method 700 then determines 704 whether the identifying information is in the recovery area 400 of the VTOC 304. If not, the deleted data set 306b cannot be recovered from the volume 300 and the method 700 ends. If so, the deleted data set 306b may be recovered from the volume 300. In such a case, the method 700 determines 708 whether any other volumes 300 were used to store the data set 306 (i.e., the deleted data set 306b may have been spread across multiple volumes 300). In certain embodiments, the metadata associated with a deleted data set 306b and stored in the recovery area 400 may include information about what other volumes 300 the deleted data set 306b was stored on. If the deleted data set 306b was stored on other volumes 300, the method 700 determines 706 whether the identifying information is included in the recovery area 400 of the other volumes 300. If not, the deleted data set 306b may only be partially recoverable. That is, portions of the deleted data set 306b may be recoverable on some volumes 300 but not on others. If, at step 710, partial recovery of the deleted data set 306b is not OK or allowed, the method 700 may end.

In the event the deleted data set 306b is fully or partially recoverable and partial recovery is OK, the method 700 retrieves 712 metadata associated with the data set 306 where it exists (including on other volumes 300 if necessary) and rebuilds 712 control information associated with the data set 306 (including on other volumes 300 if necessary). In this way, the deleted data set 306b is fully or partially restored. When the deleted data set 306b is restored, its metadata may be removed from the recovery area 400 of the volumes 300 on which it is restored.

Figure 8:
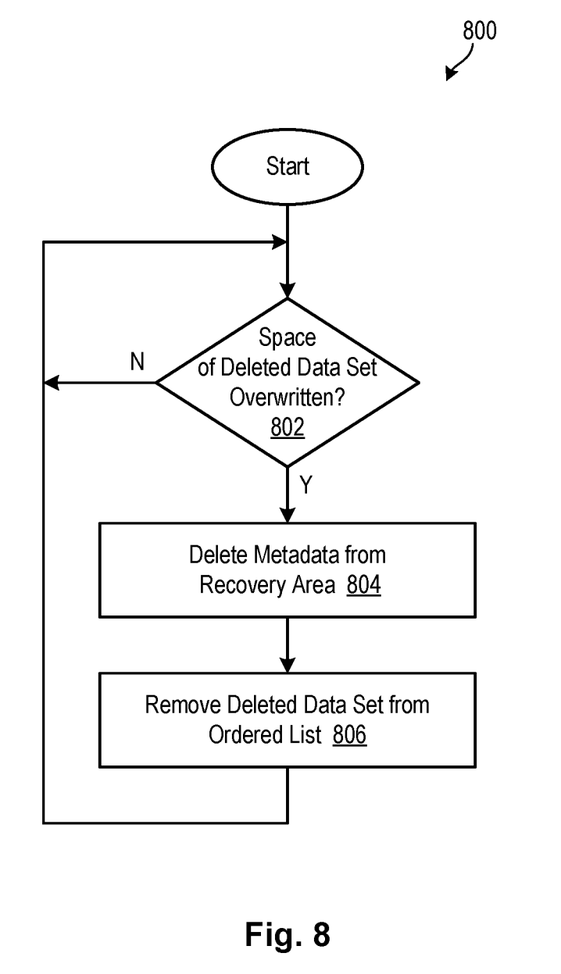
FIG. 8 is a process flow diagram showing one embodiment of a method for deleting metadata associated with a deleted data set whenever storage space associated with the deleted data set is overwritten.

FIG. 8 shows one embodiment of a method 800 for deleting metadata associated with a deleted data set 306b whenever any storage space associated with the deleted data set 306b is overwritten. As shown, the method 800 determines 802 whether any storage space (i.e., storage elements) associated with a deleted data set 306b has been overwritten. In certain embodiments, this may be accomplished by comparing overwritten areas of a volume 300 with storage elements represented in the recovery area 400 of the volume 300. If some or all storage space associated with a deleted data set 306b has been overwritten, the method 800 may delete 804 metadata associated with the deleted data set 306b from the recovery area 400. This may include removing 806 the deleted data set 306b from the ordered list 500 previously discussed.

Figure 9:
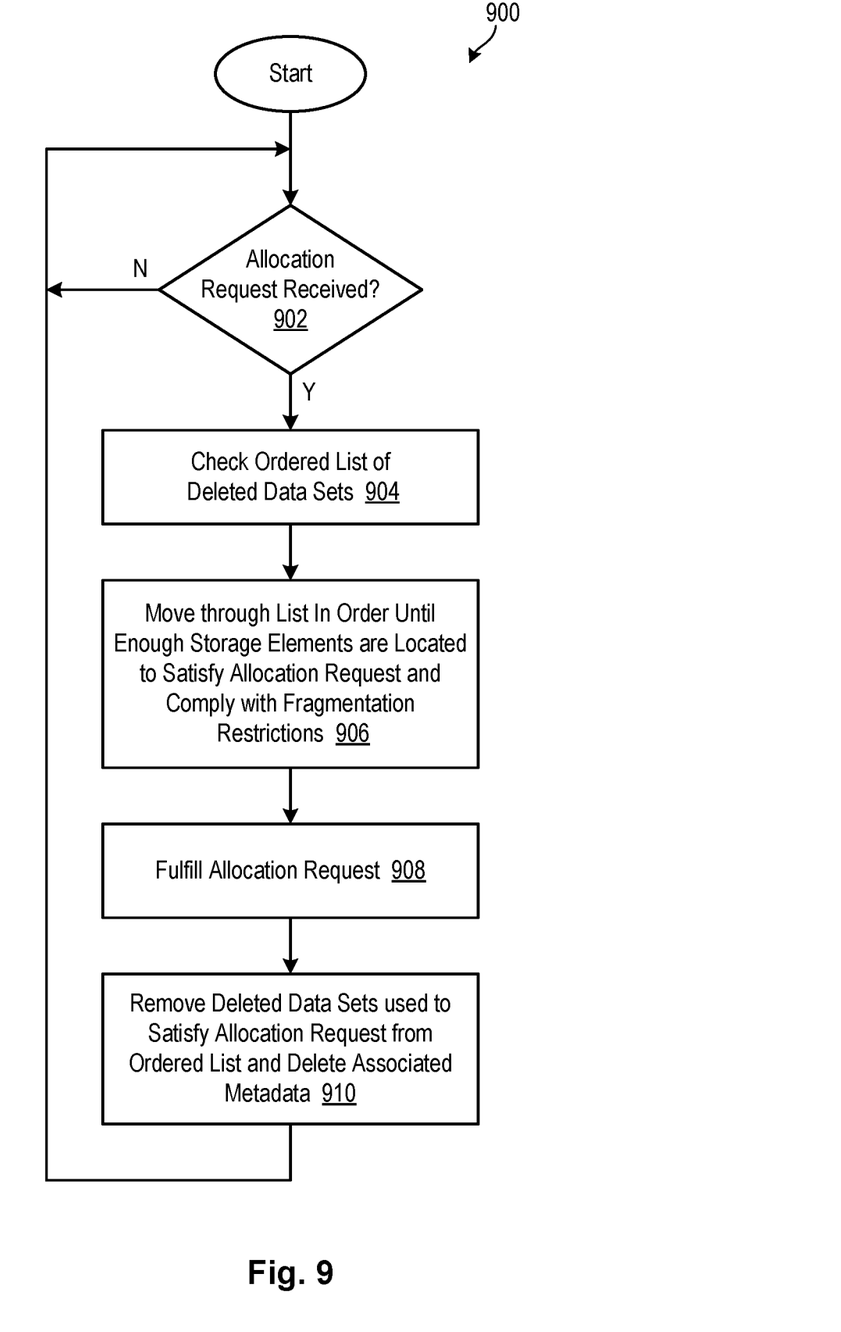
FIG. 9 is a process flow diagram showing one embodiment of a method for fulfilling allocation requests in a way that increases the probability that deleted data sets can be recovered.

FIG. 9 shows one embodiment of a method 900 for fulfilling an allocation request in a way that increases the probability that deleted data sets 306b can be recovered. As shown, the method 900 initially determines 902 whether a request to allocate storage space for a new data set 306 has been received. If so, the method 900 checks 904 the ordered list 500 of deleted data sets 306b to find storage space to allocate to the new data set 306. The method 900 moves 906 through the list 500 starting with deleted data sets 306b and associated storage elements that have been available the longest until enough storage elements are found to fulfill the allocation request. This may be performed in a way that complies with any fragmentations restrictions for the new data set 306.

Once enough storage elements are identified to satisfy the allocation request, the method 900 fulfils 908 the allocation request by allocating the storage elements to the new data set 306. The method 900 then removes 910 any deleted data sets 306b from the ordered list 500 whose storage elements were used to satisfy the allocation request, and deletes 910 any associated metadata from the recovery area 400.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for allocating storage space in a volume to a new data set, the method comprising: maintaining a list of deleted data sets and available storage elements in a volume that are associated with the deleted data sets; receiving an allocation request to allocate available storage elements in the volume to accommodate a new data set; and allocating available storage elements in the volume to fulfill the allocation request in an order the available storage elements are arranged in the list, the order favoring available storage elements that have been available for a longer amount of time over available storage elements that have been available for a shorter amount of time, wherein allocating the available storage elements comprises skipping over available storage elements in the list if needed to comply with fragmentation restrictions for the new data set.

2. The method of claim 1 wherein the deleted data sets are arranged in the list in the order they were deleted.

3. The method of claim 1, wherein fragmentation restrictions limit the new data set to a selected number of contiguous ranges of storage elements.

4. The method of claim 1, further comprising removing a deleted data set from the list when any of its available storage elements are allocated to the new data set.

5. A computer program product for allocating storage space in a volume to a new data set, the computer program product comprising a computer-readable storage medium having computer-usable program code embodied therein, the computer-usable program code configured to perform the following when executed by at least one processor: maintain a list of deleted data sets and available storage elements in a volume that are associated with the deleted data sets; receive an allocation request to allocate available storage elements in the volume to accommodate a new data set; and allocate available storage elements in the volume to fulfill the allocation request in an order the available storage elements are arranged in the list, the order favoring available storage elements that have been available for a longer amount of time over available storage elements that have been available for a shorter amount of time, wherein allocating the available storage elements comprises skipping over available storage elements in the list if needed to comply with fragmentation restrictions for the new data set.

6. The computer program product of claim 5, wherein the deleted data sets are arranged in the list in the order they were deleted.

7. The computer program product of claim 5, wherein fragmentation restrictions limit the new data set to a selected number of contiguous ranges of storage elements.

8. The computer program product of claim 5, wherein the computer-usable program code is further configured to remove a deleted data set from the list when any of its available storage elements are allocated to the new data set.

9. A system for allocating storage space in a volume, to a new data set, the system comprising: at least one processor; at least one memory device operably coupled to the at least one processor and storing instructions for execution on the at least one processor, the instructions causing the at least one processor to:

maintain a list of deleted data sets and available storage elements in a volume that are associated with the deleted data sets;

receive an allocation request to allocate available storage elements in the volume to accommodate a new data set; and allocate available storage elements in the volume to fulfill the allocation request in an order the available storage elements are arranged in the list, the order favoring available storage elements that have been available for a longer amount of time over available storage elements that have been available for a shorter amount of time, wherein allocating the available storage elements comprises skipping over available storage elements in the list of needed to comply with fragmentation restrictions for the new data set.

10. The system of claim 9, wherein the deleted data sets are arranged in the list in the order they were deleted.

11. The system of claim 9, wherein fragmentation restrictions limit the new data set to a selected.

12. The system of claim 11, wherein instructions further cause the at least one processor to remove deleted data set from the list when any of its available storage elements are allocated to the new data set.

* * * * *